(12) United States Patent
Östman

(10) Patent No.: US 11,936,501 B2
(45) Date of Patent: *Mar. 19, 2024

(54) OFDM CHANNEL ESTIMATION

(71) Applicant: Nordic Semiconductor ASA, Trondheim (NO)

(72) Inventor: Kjell Östman, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 637 days.

This patent is subject to a terminal disclaimer.

(21) Appl. No.: 17/255,368

(22) PCT Filed: Jun. 26, 2019

(86) PCT No.: PCT/EP2019/067084
§ 371 (c)(1),
(2) Date: Dec. 22, 2020

(87) PCT Pub. No.: WO2020/002476
PCT Pub. Date: Jan. 2, 2020

(65) Prior Publication Data
US 2021/0266197 A1    Aug. 26, 2021

(30) Foreign Application Priority Data
Jun. 27, 2018  (GB) .................................. 1810548

(51) Int. Cl.
*H04L 25/02* (2006.01)
*H04L 5/00* (2006.01)

(52) U.S. Cl.
CPC ........ *H04L 25/0204* (2013.01); *H04L 5/0007* (2013.01); *H04L 5/0048* (2013.01); *H04L 25/022* (2013.01)

(58) Field of Classification Search
CPC . H04L 25/0204; H04L 5/0007; H04L 5/0048; H04L 25/022; H04L 25/0228
See application file for complete search history.

(56) References Cited

U.S. PATENT DOCUMENTS 7,042,963 B1   5/2006  Raith et al.
10,333,683 B2  6/2019  Palenius et al.
(Continued)

FOREIGN PATENT DOCUMENTS

CN    105721361 A    6/2016
CN    111937452 A    11/2020
(Continued)

OTHER PUBLICATIONS

IPO Search Report under Section 17(5) for GB1810548.6, dated Dec. 27, 2018, 3 pages.
(Continued)

*Primary Examiner* — Rina C Pancholi
(74) *Attorney, Agent, or Firm* — Klarquist Sparkman, LLP

(57) ABSTRACT

A radio receiver tunes a radio channel by generating a periodic signal, mixing the periodic signal with received radio signals and passing the mixed signal through a channel filter that has a passband that corresponds to the bandwidth of the tuned channel. The receiver receives allocation information identifying a set of subcarriers in the tuned channel on which to receive an OFDM data signal. It uses this information to receive the OFDM data, modulated on the allocated subcarriers. When the allocated subcarriers span an allocated frequency range that is less than the width of the tuned channel and that is offset from the centre of the tuned channel in an offset direction, the receiver offsets the channel filter from the centre of the tuned channel in the offset direction such that the channel filter passes i) said OFDM data signal, ii) an in-allocation reference signal, and iii) an
(Continued)

out-of-channel reference signal. The receiver uses both reference signals to calculate a channel estimate for a subcarrier within the tuned channel.

13 Claims, 10 Drawing Sheets

(56) References Cited

U.S. PATENT DOCUMENTS

| | | | |
|---|---|---|---|
| 10,856,310 | B2 | 12/2020 | Rico Alvarino et al. |
| 10,972,315 | B2 | 4/2021 | Nissilä |
| 11,477,052 | B2* | 10/2022 | Östman ............... H04L 25/0228 |
| 2004/0161233 | A1 | 8/2004 | Zalevsky et al. |
| 2009/0323791 | A1 | 12/2009 | Yee |
| 2011/0228868 | A1 | 9/2011 | Hua et al. |
| 2012/0236802 | A1 | 9/2012 | Gong |
| 2015/0146640 | A1* | 5/2015 | Baldemair ............ H04L 5/0044 370/329 |
| 2017/0359820 | A1* | 12/2017 | Gaal ...................... H04L 5/005 |
| 2018/0014251 | A1 | 1/2018 | Sambhwani et al. |
| 2018/0091345 | A1 | 3/2018 | Lee et al. |
| 2018/0097596 | A1 | 4/2018 | Palanivelu et al. |
| 2018/0227937 | A1* | 8/2018 | Rico Alvarino ...... H04L 5/0044 |
| 2018/0234169 | A1 | 8/2018 | Sridharan et al. |
| 2018/0234229 | A1 | 8/2018 | Somichetty et al. |
| 2018/0248671 | A1 | 8/2018 | Bhattad et al. |
| 2018/0278442 | A1 | 9/2018 | Rogers et al. |
| 2019/0097776 | A1 | 3/2019 | Kim et al. |
| 2019/0190669 | A1 | 6/2019 | Park et al. |
| 2019/0215121 | A1 | 7/2019 | Lin et al. |
| 2019/0239170 | A1 | 8/2019 | Thangarasa et al. |
| 2019/0261308 | A1 | 8/2019 | Razavi et al. |
| 2019/0353746 | A1 | 11/2019 | Razavi et al. |
| 2020/0008198 | A1 | 1/2020 | Urabayashi et al. |
| 2020/0015279 | A1 | 1/2020 | Fujishiro et al. |
| 2020/0015280 | A1 | 1/2020 | Fujishiro et al. |
| 2020/0045667 | A1 | 2/2020 | Modarres Razavi et al. |
| 2020/0091608 | A1 | 3/2020 | Alpman et al. |
| 2020/0091944 | A1 | 3/2020 | Sundstrom et al. |
| 2020/0169367 | A1 | 5/2020 | Palanivelu et al. |
| 2020/0186321 | A1 | 6/2020 | Hwang et al. |
| 2020/0228269 | A1 | 7/2020 | Zhang et al. |
| 2020/0236644 | A1 | 7/2020 | Gunnarsson et al. |
| 2020/0245317 | A1 | 7/2020 | Hwang et al. |
| 2020/0313860 | A1 | 10/2020 | Junttila et al. |
| 2020/0322891 | A1 | 10/2020 | Östman et al. |
| 2020/0336339 | A1 | 10/2020 | Nissilä |
| 2020/0351727 | A1 | 11/2020 | Fujishiro |
| 2020/0374840 | A1 | 11/2020 | Takeda et al. |
| 2021/0007127 | A1 | 1/2021 | Hwang et al. |
| 2021/0045123 | A1 | 2/2021 | Yavuz |
| 2021/0105090 | A1 | 4/2021 | Park et al. |
| 2021/0232381 | A1 | 7/2021 | Winblad |
| 2021/0234738 | A1 | 7/2021 | Ryan et al. |
| 2021/0240870 | A1 | 8/2021 | Aune et al. |
| 2021/0297287 | A1 | 9/2021 | Östman |

FOREIGN PATENT DOCUMENTS

| | | |
|---|---|---|
| EP | 3 622 746 A4 | 7/2020 |
| GB | 2 446 439 A | 8/2008 |
| WO | WO 2017/082797 A1 | 5/2017 |
| WO | WO 2018/175724 A1 | 9/2018 |
| WO | WO 2018/222301 A1 | 12/2018 |
| WO | WO 2020/002476 A1 | 1/2020 |
| WO | WO 2020/002480 A1 | 1/2020 |

OTHER PUBLICATIONS

International Search Report and Written Opinion for PCT/EP2019/067084, dated Aug. 29, 2019, 16 pages.
Intel Corporation: "Frequency domain CRS muting for efeMTC", 3GPP TSG RAN WG1 Meeting #88bix, R1-1704695, Apr. 2017, 4 pages.
SONY: "Frequency Domain CRS Muting for efeMTC", 3GPP TSG RAN WG1 Meeting #88bix, R1-1705206, Apr. 2017, 4 pages.
Math Works, "Channel Estimation," https://www.mathworks.com/help/lte/ug/channel-estimation.html?s_tid=gn_loc_drop, downloaded Oct. 11, 2017, 8 pages.
IPO Search Report under Section 17(5) for GB1810547.8, dated Dec. 27, 2018, 5 pages.
International Search Report and Written Opinion for PCT/EP2019/067089, dated Aug. 29, 2019, 16 pages.

* cited by examiner

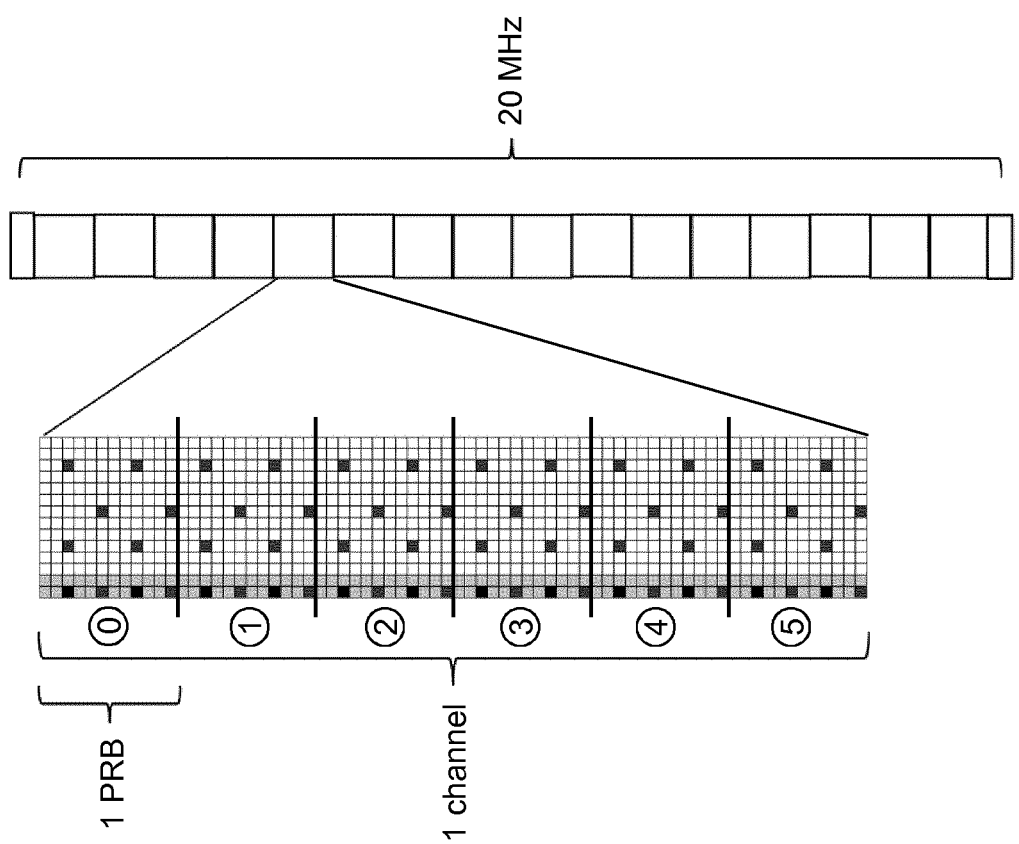

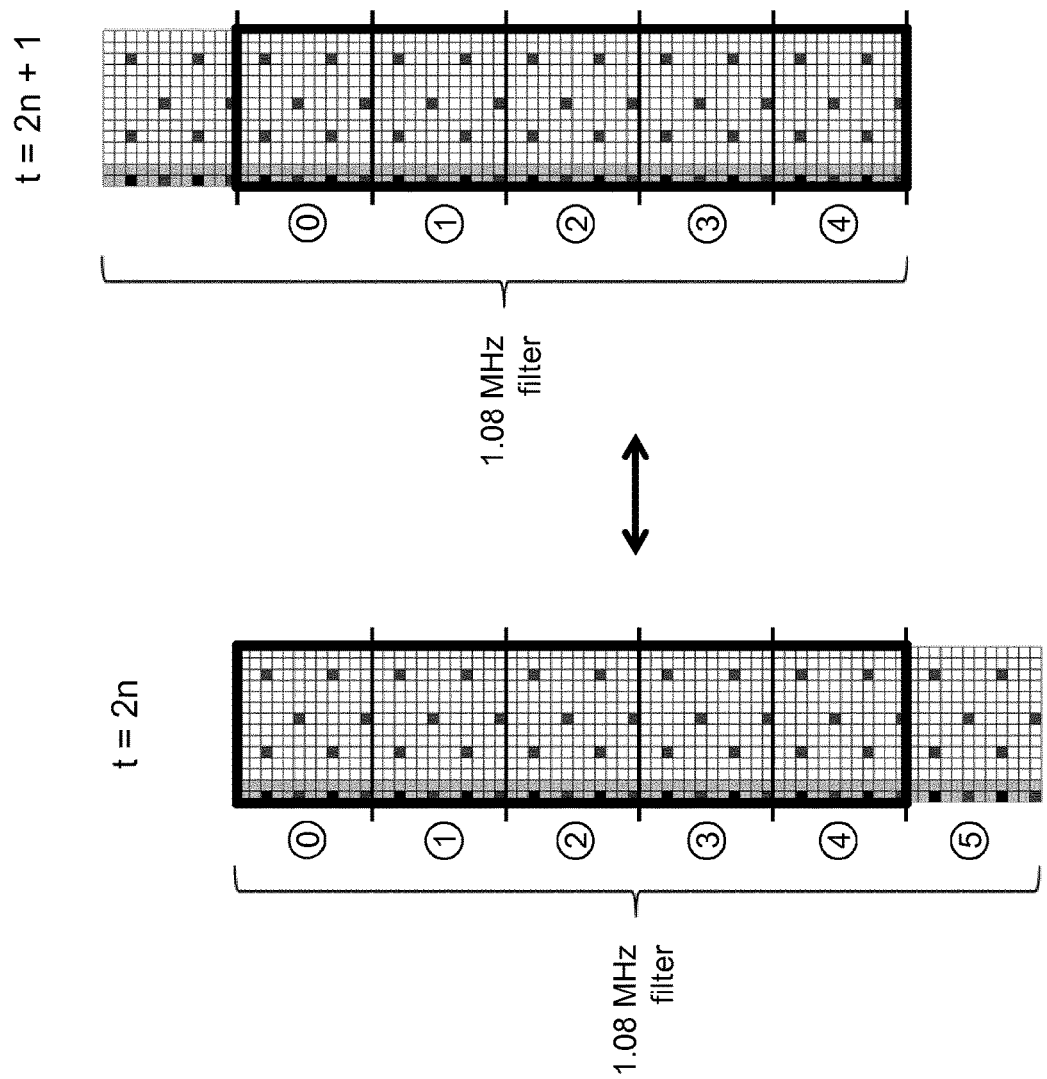

OFDM CHANNEL ESTIMATION

CROSS REFERENCE TO RELATED APPLICATIONS

This is the U.S. National Stage of International Application No. PCT/EP2019/067084, filed Jun. 26, 2019, which was published in English under PCT Article 21(2), which in turn claims the benefit of Great Britain Application No. 1810548.6, filed Jun. 27, 2018.

BACKGROUND OF THE INVENTION

This invention relates to channel estimation in Orthogonal Frequency Division Multiplexing (OFDM) radio receivers.

OFDM is a form of radio transmission that is used in various radio protocols such as Long Term Evolution (LTE), various IEEE 802.11 standards, DAB radio, DVB-T, and WiMAX. Rather than encoding data on a single carrier frequency, a data stream is spread over some or all of a radio channel containing multiple OFDM subcarriers. The OFDM subcarriers are typically closely spaced, at regular intervals, across the frequency spectrum, although this is not essential. The subcarriers are orthogonal to avoid mutual interference. OFDM can thereby provide good resilience to multipath fading and to external interference. In some systems, multiple data streams—e.g., being sent to a plurality of cellular-network receivers—can share one channel, by multiplexing the OFDM data signals in time and/or frequency. For example, for a particular time period, the network may allocate distinct subsets of the subcarriers to respective receivers.

It is known for an OFDM radio transmitter, such as a cellular network base station (BS), to transmit predetermined reference signals at predefined time slots and on predetermined subcarrier frequencies. These reference signals, time slots and subcarriers are known in advance by associated radio receivers, such as user equipment (UE) on the network. In an LTE downlink, these reference signals are predetermined QPSK di-bits referred to as cell-specific reference signal (CRS) resource elements (RE). An LTE base station, for example, transmits these cell-specific reference signals (CRS's) on every third subcarrier across a channel, at predetermined time intervals.

User equipment, such as a cell phone, when tuned to a particular radio channel (which, for LTE, may have a channel bandwidth of 1.4, 3, 5, 10, 15 or 20 MHz, containing subcarriers spaced at 15 kHz intervals), receives the predetermined reference signals for the channel and uses these reference signals to generate respective channel estimates for individual subcarriers in the channel. Such channel estimates, $\hat{h}_{filt}(i)$, can be determined for a particular reference signal, i, by: i) calculating a set of unfiltered channel estimates, $\hat{h}_{CRS}(j)$, for a filter set of reference signals in the channel, j, located in a time and frequency window around the particular reference signal, i, and ii) applying a mathematical filter (such as a set of weights) to this set of unfiltered estimates, or to the unfiltered reference signals, j, in any other appropriate way, to generate a filtered channel estimate, $\hat{h}_{filt}(i)$.

However, the present applicant has recognised that the accuracy of such filtered channel estimates can reduce significantly for subcarriers located towards the edges of the channel. This is undesirable in all cases, but the applicant has recognised that this can be particularly problematic when communicating over relatively narrow channels, such as the narrowband downlink channels of LTE Category-M1 (LTE-M), which have a transmission bandwidth of only 1.08 MHz. This is because there is a higher probability that an OFDM downlink data signal will be allocated to subcarriers that are located near the edge of the channel, because there are fewer subcarriers that are not near the channel edge, compared with the situation for wider channels.

The present invention seeks to provide a new approach to determining OFDM channel estimates that may provide improved accuracy.

SUMMARY OF THE INVENTION

From a first aspect, the invention provides a radio communication system comprising:
a radio transmission system for transmitting OFDM data signals over respective channels of a plurality of predetermined radio channels, each channel having a respective channel bandwidth and comprising a respective plurality of OFDM subcarriers, and for transmitting predetermined reference signals at predetermined times on a reference-signal set of the OFDM subcarriers; and
a radio receiver, comprising a local oscillator and a channel filter,
wherein the radio receiver is configured to tune a channel of the plurality of radio channels by:
controlling the local oscillator to generate a periodic signal;
receiving radio signals from the radio transmission system and mixing the radio signals with the periodic signal to generate a mixed signal; and
passing the mixed signal through the channel filter, wherein the channel filter has a passband that corresponds to the bandwidth of the tuned channel,
wherein the radio receiver is configured to receive, from the radio transmission system, allocation information identifying a set of allocated subcarriers, of the plurality of OFDM subcarriers in the tuned channel, on which to receive an OFDM data signal, wherein the radio receiver is configured to use the allocation information to receive the OFDM data signal, from the radio transmission system, modulated on the allocated subcarriers,
wherein, when the allocated subcarriers span an allocated frequency range that is less than the width of the tuned channel and that is offset from the centre of the tuned channel in an offset direction, the radio receiver is configured to offset the channel filter from the centre of the tuned channel in said offset direction by a filter offset amount, such that the channel filter passes i) said OFDM data signal; ii) an in-allocation reference signal of the predetermined reference signals, received on a subcarrier of the allocated subcarriers; and iii) an out-of-channel reference signal of the predetermined reference signals, received on an out-of-channel subcarrier of the plurality of OFDM subcarriers that is located outside the tuned channel, and wherein the radio receiver comprises channel estimation logic configured to use both i) the in-allocation reference signal, and ii) the out-of-channel reference signal, to calculate a channel estimate for a subcarrier of the allocated subcarriers within the tuned channel.

From a second aspect, the invention provides a radio receiver for receiving an OFDM data signal from a radio transmission system that transmits OFDM data signals over respective channels of a plurality of predetermined radio channels, each channel having a respective channel bandwidth and comprising a respective plurality of OFDM subcarriers, and that transmits predetermined reference signals at predetermined times on a reference-signal set of the OFDM subcarriers, wherein the radio receiver comprises a local oscillator and a channel filter;

wherein the radio receiver is configured to tune a channel of the plurality of radio channels by:
controlling the local oscillator to generate a periodic signal;
receiving radio signals from the radio transmission system and mixing the radio signals with the periodic signal to generate a mixed signal; and
passing the mixed signal through the channel filter, wherein the channel filter has a passband that corresponds to the bandwidth of the tuned channel, wherein the radio receiver is configured to receive, from the radio transmission system, allocation information identifying a set of allocated subcarriers, of the plurality of OFDM subcarriers in the tuned channel, on which to receive an OFDM data signal, wherein the radio receiver is configured to use the allocation information to receive the OFDM data signal, from the radio transmission system, modulated on the allocated subcarriers, wherein, when the allocated subcarriers span an allocated frequency range that is less than the width of the tuned channel and that is offset from the centre of the tuned channel in an offset direction, the radio receiver is configured to offset the channel filter from the centre of the tuned channel in said offset direction by a filter offset amount, such that the channel filter passes i) said OFDM data signal; ii) an in-allocation reference signal of the predetermined reference signals, received on a subcarrier of the allocated subcarriers; and iii) an out-of-channel reference signal of the predetermined reference signals, received on an out-of-channel subcarrier of the plurality of OFDM subcarriers that is located outside the tuned channel, and wherein the radio receiver comprises channel estimation logic configured to use both i) the in-allocation reference signal, and ii) the out-of-channel reference signal, to calculate a channel estimate for a subcarrier of the allocated subcarriers within the tuned channel.

From a third aspect, the invention provides a radio communication method for receiving an OFDM data signal from a radio transmission system that transmits OFDM data signals over respective channels of a plurality of predetermined radio channels, each channel having a respective channel bandwidth and comprising a respective plurality of OFDM subcarriers, and that transmits predetermined reference signals at predetermined times on a reference-signal set of the OFDM subcarriers, the method comprising:
a radio receiver tuning a channel of the plurality of radio channels by:
generating a periodic signal;
receiving radio signals from the radio transmission system and mixing the radio signals with the periodic signal to generate a mixed signal; and
passing the mixed signal through a channel filter; and
the radio receiver receiving, from the radio transmission system, allocation information identifying a set of allocated subcarriers, of the plurality of OFDM subcarriers in the tuned channel, on which to receive an OFDM data signal;
the radio receiver using the allocation information to receive the OFDM data signal, from the radio transmission system, modulated on the allocated subcarriers, the method further comprising:
the allocated subcarriers spanning an allocated frequency range that is less than the width of the tuned channel and that is offset from the centre of the tuned channel in an offset direction;
the radio receiver offsetting the channel filter from the centre of the tuned channel in said offset direction by a filter offset amount;
the channel filter having a passband that is wider than the allocated frequency range, such that the channel filter passes i) said OFDM data signal; ii) an in-allocation reference signal of the predetermined reference signals, received on a subcarrier of the allocated subcarriers; and iii) an out-of-channel reference signal of the predetermined reference signals, received on an out-of-channel subcarrier of the plurality of OFDM subcarriers that is located outside the tuned channel; and
the radio receiver using both i) the in-allocation reference signal, and ii) the out-of-channel reference signal, to calculate a channel estimate for a subcarrier of the allocated subcarriers within the tuned channel.

The method may further comprise the radio transmission system transmitting OFDM data signals over said respective channels. It may further comprise the radio transmission system transmitting said predetermined reference signals at said predetermined times on the reference-signal set of the OFDM subcarriers.

Thus it will be seen that, in accordance with the invention, when a particular downlink data signal is allocated to only a subset of the subcarriers in a tuned channel, and when these allocated subcarriers are offset from the centre of the tuned channel, the radio receiver may offset its channel filter from the centre of the tuned channel. Because the channel filter corresponds to the width of the tuned channel (e.g., has a passband equal to the bandwidth of tuned channel, or substantially equal to the tuned bandwidth, allowing for filter roll-off), such offsetting of the filter can enable the radio to receive at least one reference signal on a subcarrier that is located outside the tuned channel. The receiver can use this out-of-channel reference signal when generating a channel estimate for a subcarrier within the allocated frequency range. In this way, the radio receiver may generate a filtered channel estimate for an allocated subcarrier within the tuned channel using a filter set of reference signals that extends beyond the frequency boundaries of predetermined tuned channel. The applicant has found that this approach can improve the accuracy of channel estimates calculated for the allocated subcarriers, especially those subcarriers that are located towards an edge of the tuned channel. This can lead to a greater consistency in the channel estimates across the set of allocated subcarriers.

This approach can be contrasted with a naïve implementation in which the channel filter is always centred the tuned channel, even when the allocated subcarriers are offset towards an edge of the tuned channel. In such an implementation, the radio receiver cannot make use of reference signals on subcarriers located outside the tuned channel, when generating channel estimates for subcarriers within the tuned channel (such as one of the allocated subcarriers). This is because any reference signals from channels outside the tuned channel will be removed by the channel filter. This can lead to channel estimates towards an edge of the allocated subcarriers having lower amplitude and/or worse signal-to-noise ratio (SNR) and/or greater phase error, than channel estimates elsewhere in the allocated subcarriers. The reasons for this are explained in greater detail below, with reference to FIGS. 4-11.

The allocation information may specify a set of allocated subcarriers that are contiguous subcarriers.

The filter offset amount may equal an integer multiple of subcarrier intervals or widths. In general, the greatest improvement will be experienced when the channel filter is offset so that it is centred on the allocated frequencies. Thus, at times (i.e., when appropriate criteria are met), the filter offset amount may equal an amount by which a centre frequency of the allocated frequency range is offset from the centre of the tuned channel. However, this is not necessarily always the case; at times, the channel filter may be centred on the allocated frequencies, even when they do not fully occupy the tuned channel.

In systems in which the subcarriers are grouped in blocks of uniform frequency width, such as in LTE where subcarriers are grouped in physical resource blocks (PRBs), the filter offset may be an integer multiple of the block width. In this case, the filter offset may be the greatest integer that is less than or equal to the number of block widths by which the centre of the allocated frequency range is offset from the centre of the tuned channel. For example, if the centre of the allocated frequencies is offset from the centre of the channel by two blocks, the channel filter may be offset in the same direction by two blocks; if it is offset by three blocks, the filter offset may be one block.

The radio receiver may be configured to determine the filter offset amount based on one or more further criteria, in addition to the allocation information. These may include: the position of the tuned channel within the plurality of radio channels, and/or whether the radio receiver needs to receive data (e.g., control channel data) on one or more of the unallocated subcarriers in the tuned channel; and/or a position within a temporal pattern of varying offset amounts (described in more detail below). Thus, the radio receiver may be configured to use a less than optimal filter offset amount, or even zero offset, in some circumstances, even though the allocated subcarriers are offset within the tuned channel. However, for all embodiments, there will always be some circumstances in which a non-zero filter offset amount will be used.

The plurality of predetermined radio channels may include one or more LTE Cat-M1 (LTE-M) channels, which may each have a fixed channel bandwidth of 1.08 MHz. In particular, the tuned channel may be an LTE-M channel. The plurality of predetermined radio channels may include one or more LTE channels, such as a 3, 5, 10, 15 or 20 MHz LTE channel. The predetermined radio channels may occupy distinct frequency ranges or two or more channel may overlap—e.g., a 1.08 MHz LTE-M channel may be located within a 20 MHz LTE channel. The plurality of radio channels may have a common channel bandwidth (e.g., it may comprise a plurality of LTE-M channels, each being 1.08 MHz wide), or at least two of the channels may have different bandwidths from each other.

The channel filter may be offset relative to the tuned channel by at least the width of one additional OFDM subcarrier. It may be offset by at least two, three, four or more OFDM subcarrier widths or subcarrier intervals. In some embodiments, the channel filter may pass a plurality of out-of-channel OFDM subcarriers, located outside the tuned channel, that carry respective out-of-channel reference signals. This plurality of out-of-channel OFDM subcarriers may all be located beyond just one edge of the tuned channel, in the offset direction (i.e., all having a higher frequency than the tuned channel, or all having a lower frequency than the tuned channel). The radio receiver may use a plurality of out-of-channel reference signals, on different out-of-channel OFDM subcarriers, to calculate the channel estimate for the allocated subcarrier within the tuned channel. The radio receiver may, additionally or alternatively, use a plurality of out-of-channel reference signals on a single out-of-channel OFDM subcarrier to calculate the channel estimate for the allocated subcarrier within the tuned channel.

The reference-signal set of the OFDM subcarriers may include every subcarrier across the plurality of radio channels, or it may consist of a subset of these subcarriers—e.g., at most every third subcarrier.

The radio receiver may calculate the channel estimate in any appropriate way. The radio receiver may calculate channel estimates for a plurality of OFDM subcarriers within the tuned channel. It may use a filter set of reference signals when calculating channel estimates. It may apply a set of filter weights to the filter set of reference signals. For example, it may calculate a weighted sum of the unfiltered reference signals in the filter set, or of unfiltered channel estimates for the reference signals in the filter set. However, in contrast to naïve approaches in which the filter set becomes distorted for allocated subcarriers that are near the edges of the tuned channel, and thus near the edge of the channel filter when it is centred on the tuned channel, in embodiments of the present invention the filter set may include one or more out-of-channel reference signals; this may particularly be the case when calculating channel estimates for subcarriers towards an edge of the tuned channel.

In some embodiments, channel estimates are calculated using a filter window (i.e., a span of frequency and/or time that encompasses a filter set of one or more reference signals) that has a common frequency extent when calculating channel estimates for each of a plurality of OFDM subcarriers within the tuned channel. When calculating a channel estimate for an allocated subcarrier located on the edge of the tuned channel, approximately half of the reference signals in the filter window may be out-of-channel reference signals, and half may be in-channel reference signals. The filter window may encompass two, five, ten or more subcarriers that carry reference signals. The filter window may have a constant or variable time extent. The filter window may have a constant or variable frequency extent. Thus the shape of the filter window may be constant over time or it may change over time. The filter window may be rectangular or any other appropriate shape. A set of filter weights may be applied to unfiltered reference signals within the filter window. The filter weights may be constant over time or they may change over time.

The channel filter may be offset so as to pass a number of out-of-channel OFDM subcarriers equal to, or at least equal to, half the number of subcarriers spanned by the filter window. In this way, the filter window can be positioned (i.e. centred) on an allocated subcarrier that is right on an edge of the tuned channel, and still encompass the same number of reference signals as when the filter window is positioned wholly within the tuned channel. This can provide a more consistent power level and SNR for the channel estimates across the width of the allocated subcarriers. It can also ensure a symmetrical distribution of reference signals in frequency about the centre of the filter window, wherever the filter window is positioned in the channel, thereby allowing any sample timing errors to be averaged out consistently.

The radio receiver may be a direct-conversion (zero-IF) radio receiver. The mixed signal may be at baseband. The periodic signal may have a tuning frequency that is within the tuned channel. The radio receiver may be configured to control the local oscillator so that the periodic signal is offset from the centre of the tuned channel, in the offset direction, by the filter offset amount. At least in some circumstances, the periodic signal may be set to the centre of the allocated frequency range, or to a boundary between adjacent blocks of subcarriers (e.g., adjacent LTE PRB's) that is a closest boundary to the centre of the allocated frequency range.

Alternatively, the radio receiver may be a superheterodyne receiver. The periodic signal may cause the mixed signal to be down-converted to an intermediate frequency. The channel filter may be applied to the mixed signal at an intermediate frequency, or the mixed signal may be further down-converted—e.g., to baseband—before being passed through the channel filter.

The radio receiver may comprise an analogue-to-digital converter for converting the mixed signal to a digital signal.

The radio receiver may be configured to maintain a constant filter offset for as long as the allocated subcarriers remain constant, while receiving the OFDM data signal. However, it may also be configured, for at least some allocations of subcarriers, to change the filter offset amount over time, while receiving the OFDM data signal, even when the allocated subcarriers remain the same. This may be beneficial when it is not possible, or is not desirable, to centre the channel filter over the allocated frequency range. Some radio receivers may only support offset amounts that are an integer multiple of one PRB. In this case, centering the filter may be impossible, depending on the number of PRB's in the allocated range. In some embodiments, the offset amount may be changed over time when the subcarriers are arranged in equal-sized blocks and the allocated frequency range spans a number of blocks that has a different parity from the number of blocks across the tuned channel—that is, when there is an odd number of allocated blocks in a channel that spans an even number of blocks (such as three allocated PRB's in an LTE-M channel that is six PRB's wide), or an even number of allocated blocks in a channel that contains an odd number of blocks.

The radio receiver may alternate the filter offset amount between two values. The two values may be one block's width apart. They may be the two closest integer number of blocks to the fractional number of blocks by which the centre of the allocated range is offset from the centre of the channel (i.e., half a block above and half a block below this amount). The radio receiver may be configured change the value at regular intervals. For one or more subcarriers, the radio receiver may be configured to apply a different weighting to a channel estimate for the subcarrier depending on the filter offset amount, when further processing the channel estimates (e.g., when averaging a plurality of channel estimates over time). In this way, a channel estimate can be given a lower weighting, or disregarded entirely, for a time interval when the subcarrier is closer to an edge of the channel filter, and given a higher weighting when the subcarrier is further from the edge of the channel filter. This can improve the quality of the channel estimates. The weighting may be applied to the amplitude or phase of the channel estimates.

The channel filter may be implemented in any appropriate way. It may comprise a plurality of filter stages. It may comprise one or more digital filters and/or one or more analogue filters. It may comprise a bandpass filter. It may be symmetrical in shape (i.e., having symmetrical roll off at each end). In some embodiments, the mixed signal may be at baseband, or may be shifted to baseband, and the channel filter may comprise a low-pass filter configured to act on the mixed signal at baseband. For example, if the filtering is applied at baseband, a channel filter with a passband of 1.08 MHz may be implemented as a low-pass baseband filter having a nominal width of 540 kHz. In general, references herein to the passband of a channel filter may be understood as referring to the width of the filter at the carrier frequency (or at an intermediate frequency). The radio receiver may comprise a digital or analogue mixer for mixing the signals.

One benefit of the present invention is that it can be implemented on radio designs that already contain a channel filter that is sized for the tuned channel purely through a software change. It does not require the provision of a non-standard channel filter, and so can be implemented on legacy devices without requiring any hardware modifications.

Thus, from further aspects, the invention provides software, and a transient or non-transient carrier bearing the same, comprising instructions which, when executed by a processor of a radio receiver, cause the radio receiver to receive an OFDM data signal from a radio transmission system that transmits OFDM data signals over respective channels of a plurality of predetermined radio channels, each channel having a respective channel bandwidth and comprising a respective plurality of OFDM subcarriers, and that transmits predetermined reference signals at predetermined times on a reference-signal set of the OFDM subcarriers, wherein:

the radio receiver comprises said processor, a local oscillator and a channel filter;

the radio receiver is configured to tune a channel of the plurality of radio channels by:

controlling the local oscillator to generate a periodic signal;

receiving radio signals from the radio transmission system and mixing the radio signals with the periodic signal to generate a mixed signal; and passing the mixed signal through the channel filter, wherein the channel filter has a passband that corresponds to the bandwidth of the tuned channel; and the radio receiver is configured to receive, from the radio transmission system, allocation information identifying a set of allocated subcarriers, of the plurality of OFDM subcarriers in the tuned channel, on which to receive an OFDM data signal;

the radio receiver is configured to use the allocation information to receive the OFDM data signal, from the radio transmission system, modulated on the allocated subcarriers;

and wherein the software comprises instructions for controlling the radio receiver so that:

when the allocated subcarriers span an allocated frequency range that is less than the width of the tuned channel and that is offset from the centre of the tuned channel in an offset direction, the radio receiver offsets the channel filter from the centre of the tuned channel in said offset direction by a filter offset amount, such that the channel filter passes i) said OFDM data signal; ii) an in-allocation reference signal of the predetermined reference signals, received on a subcarrier of the allocated subcarriers; and iii) an out-of-channel reference signal of the predetermined reference signals, received on an out-of-channel subcarrier of the plurality of OFDM subcarriers that is located outside the tuned channel; and the processor uses both i) the in-allocation reference signal, and ii) the out-of-channel reference signal, to calculate a channel estimate for a subcarrier of the allocated subcarriers within the tuned channel.

In any aspects disclosed herein, it will be appreciated that the width of the channel filter passband may be defined in any appropriate way (e.g., the distance between the half-power points). What is important is that the channel filter is sufficiently wide that it can pass out-of-channel reference signals on one or more out-of-channel OFDM subcarriers with sufficient signal strength that the radio receiver can use these out-of-channel reference signals when calculating channel estimates. Similarly, the widths of the channels, and the subcarriers, and the allocated frequency range, may be defined in any appropriate conventional manner.

The radio receiver may pass the mixed signal through the channel filter with a centre point of the channel filter offset from a centre frequency of the channel (after down-conversion) by the filter offset amount. When the radio receiver is a direct-conversion receiver, the periodic signal may have a tuning frequency that is offset from the centre of the tuned channel, in the offset direction, by the filter offset amount.

In some situations, the radio transmission network may not transmit reference signals across the full width of the channel filter when the channel filter is offset so as to be centred over the allocated subcarriers. For example, when the tuned channel is the first or last channel of a succession of channels, there may be no reference signals beyond one end of the tuned channel, or there may only be limited reference signals.

When the OFDM data signal is modulated over all of the OFDM subcarriers in the tuned channel, the radio received is preferably configured to apply zero filter offset, such that the channel filter is centred on the tuned channel. When the allocation data identifies a subset of the OFDM subcarriers within the tuned channel on which the OFDM data signal will be communicated, the radio receiver may apply a filter offset. The radio receiver may be configured to respond to changes in the allocation while the OFDM data signal is being received; this may involve changing the channel filter offset while receiving the data signal. The allocation data may also communicate one or more time slots within which the OFDM data signal will be communicated.

The predetermined reference signals may be reference symbols, such as predefined QPSK di-bits. The radio receiver preferably knows, or is able to calculate, the predetermined reference signals and the predetermined times at which they are transmitted.

The OFDM data signals may be modulated in any appropriate way—e.g., using phase-modulation and/or frequency-modulation and/or amplitude-modulation. The data signals are preferably digital signals.

The channel estimates may be used for coherent demodulation, or for measuring the channel quality, or for any other purpose. The radio receiver may use one or more channel estimates to calculate a signal power estimate and/or a noise power estimate and/or a signal-to-noise ratio estimate for a particular reference signal or particular subcarrier, or for the tuned channel as a whole. The radio receiver may send information derived from the channel estimate for an sub-carrier to the radio transmission system, which may use the information to control transmissions from the radio transmission system.

The radio transmission system may be a single radio transmitter. However, in other embodiments the radio transmission system comprises a network of two or more linked radio transmitters or base stations. The radio transmission system may form part or all of a cellular communications network.

In some embodiments, the radio transmission system comprises an Long Term Evolution (LTE) radio transmission system. The reference signals may be cell-specific reference signals (CRS's)—i.e., respective CRS resource elements (RE's). The OFDM data signal could be any category of LTE signal. The radio channels could be 20 MHz, 15 MHz, 10 MHz or 5 MHz channels, and the OFDM data signal could be a signal in an LTE category wherein the data signal may occupy all of such a channel (e.g., Cat-0, Cat-3 or Cat-4). In this case, the channel filter will be wider than 20, 15, 10 or 5 MHz, respectively.

However, in a preferred set of embodiments, the radio channels include one or more LTE Cat-M1 (LTE-M) channels, having a fixed width of 1.08 MHz. The OFDM data signal may be an LTE-M signal. At any moment in time, the OFDM data signal may be transmitted over all six physical resource blocks (PRBs), in frequency, of the tuned LTE-M channel, or it may be allocated a contiguous subset of between one and five of these PRBs. The radio transmission system may also transmit one or more categories of LTE signal other than Cat-M1 on other subcarriers in a common frequency band with the LTE-M channels. The out-of-channel CRS or CRS's may be transmitted in one or more LTE-M channels adjacent the tuned channel, or they may be transmitted in an LTE channel that is not an LTE-M channel.

The nominal bandwidth of the tuned LTE-M channel is 1.08 MHz. The channel filter is preferably sized so that, when it is centred on the tuned LTE-M channel, it passes all the subcarriers in the tuned LTE-M channel and filters all LTE subcarriers outside the tuned channel.

When the channel filter is offset, the filter offset amount may be such that the channel filter passes one or more full PRBs that are wholly located outside the tuned LTE-M channel (over which the OFDM data signal is transmitted). It may be offset by an integer number of PRBs—e.g., with a filter offset amount equal to the width of one, two, three, four or five PRBs. However, some embodiments may be able to offset the channel filter by a fractional amount of a PRB, such as any integer multiple of 0.5 PRB's.

In some situations, the radio transmission system may not transmit data or CRS's on this number of PRBs outside the tuned channel—e.g., when the tuned LTE-M channel is located at the edge of an 5 MHz LTE band. Preferably, the radio receiver sets the filter offset amount so that the channel filter does not extend beyond an LTE band containing the LTE-M channel. More generally, the offset amount may be such that the channel filter passes only spectrum occupied by OFDM subcarriers transmitted by the radio transmission system, and passes no spectrum outside these OFDM subcarriers.

The radio receiver may comprise decoding logic for decoding the OFDM data signal.

The channel estimation logic and/or decoding logic and/or the radio receiver more generally may comprise electronic circuitry for performing the described operations. It may comprise an electronic circuit or circuit portion. It may be implemented using application-specific circuitry (e.g., an ASIC), or it may comprise one or more FPGAs, MCUs and/or processors, which may include one or more GPUs or DSPs. It may perform some or all operations in hardware, or may perform some or all operations in software. In some embodiments, the channel estimation logic may be purely software—i.e., consisting of software instructions which, when executed on a suitable processing system, cause the processing system to perform the described operations, or it may be a hard-coded logic device.

The radio receiver may also include a radio transmitter. The radio receiver may comprise a radio-on-a-chip device.

The radio receiver may be a machine-to-machine (M2M) communication device. It may be LTE-M user equipment.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which:

FIG. 3 is a diagram of a resource grid for an LTE-M channel in the context of 20 MHz system channel;

FIG. 16 is a diagram of a resource grid for an LTE-M channel showing two alternating filter positions used in some embodiments when four PRBs have been allocated;

DETAILED DESCRIPTION

Figure 1:
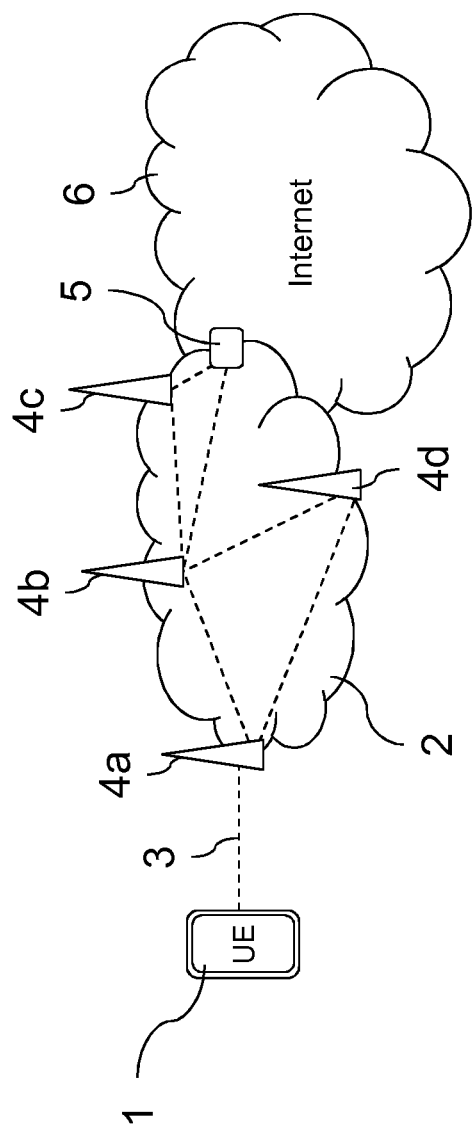
FIG. 1 is a schematic drawing of a telecommunications system in which the invention can be implemented.

FIG. 1 shows a User Equipment (UE) device 1, such as a wireless temperature sensor, which contains a radio receiver and a radio transmitter for communicating with a cellular telecommunications network 2 which supports LTE Cat-M1 (LTE-M) communication.

The device 1 can receive data from the network 2 over a radio link 3 on an LTE-M channel. The network 2 may comprise an Evolved Universal Terrestrial Radio Access Network (E-UTRAN). The network 2 includes a number of base stations 4a-4d, which may be LTE eNodeB's. A Serving Gateway 5 enables the device 1 to communicate over the Internet 6—e.g., with a remote server (not shown). Other standard components of an LTE network are omitted for simplicity.

Any number of other devices may be receiving data from the same base station 4a at the same time as the device 1. These may be other LTE-M devices, or devices using other categories of LTE, such as for voice communication. The network 2 allocates subcarrier frequencies and time slots to each device by allocating unique physical resource blocks (PRBs) to each device, in known manner.

The device 1, and the system as a whole, embody the present invention. The system and device 1 can be used to implement methods of the present invention, as described below.

Figure 2:
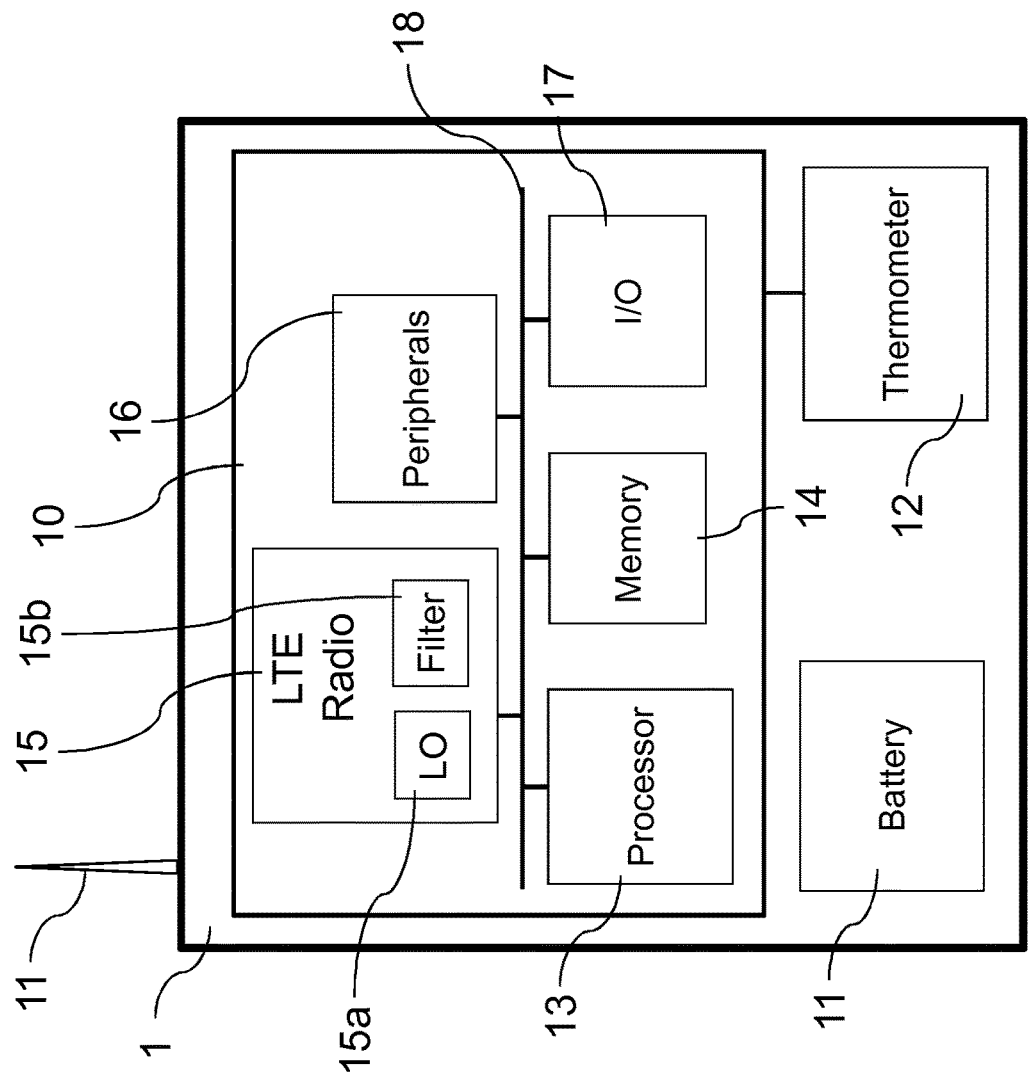
FIG. 2 is a schematic drawing of a wireless temperature sensor embodying the invention.

FIG. 2 provides more detail of the device 1, which, in this example, is a wireless temperature sensor. (Of course, the invention may also be implemented in many other types of device.)

The wireless temperature sensor device 1 contains an integrated-circuit radio-on-a-chip 10, a battery 11 and a thermometer 12. It may also contain other discrete components, such as PCBs, oscillators, capacitors, resistors, a housing, user interface features, etc. which are omitted from FIG. 2 for the sake of simplicity.

The radio chip 10 contains a processor 13, memory 14 (which may include volatile and non-volatile memory types), an LTE Cat-M1 (LTE-M) radio 15, general peripherals 16 (which may include a hardware cryptography engine, digital-to-analogue converters, timers, etc.) and input/output peripherals 17 (e.g., a USB interface). These elements are all connected to a bus system 18 (e.g., compliant with the Arm' Advanced Microcontroller Bus Architecture) which supports direct memory access (DMA) to the memory-mapped peripherals 16, 17. In one example, the processor 13 is an Arm' Cortex™-M series processor, although it could be any type of processor.

The LTE-M radio 15 includes a direct-conversion receiver, as well as a radio transmitter. It contains digital logic and analogue components that will be familiar to one skilled in the art. Among other components, the radio 15 includes a local oscillator 15a and a channel filter 15b for receiving LTE-M signals. The channel filter 15b has a 1.08 MHz passband width.

The radio 15 may contain a further general-purpose processor (not shown) for implementing the LTE-M radio protocol using software. The LTE-M radio 15 and/or radio chip 10 may contain other conventional components, such as DSPs, amplifiers, filters, ADCs, DACs, etc. The device 1 also has an antenna 11 which is connected to the LTE-M radio 7 via appropriate off-chip components (not shown).

The memory 14 stores software which is executed by the processor 13 for controlling the operation of the wireless temperature sensor device 1. In use, the processor 13 uses the I/O peripherals 17 to fetch temperature readings from the thermometer 12 at intervals and writes these to the memory 14. The processor 13 sends a log to a remote server at periodic intervals (e.g., hourly, or daily). The device 1 can also receive data from the remote server, such as acknowledgement messages, new configuration settings, and firmware updates.

When the device 1 is to receive data from the cellular telecommunications network 2 on a particular 1.08 MHz wide LTE-M channel, the radio 15 sets the local oscillator 15a so that it generates a periodic signal for tuning the LTE-M channel. The control of this local oscillator 15a is described in more detail below.

Each LTE-M channel fits six PRB's within its frequency width.

FIG. 3 shows how one LTE-M channel, containing six PRB's (labelled 0 to 5), can fit within a 20 MHz LTE system channel. A 20 MHz system channel may contain one or more LTE-M channels, up to a maximum of sixteen. Each PRB consists of 12 subcarriers (each 15 kHz apart, so occupying 180 kHz in total)×7 OFDM symbols (occupying 0.5 ms in total).

The radio 15 will be instructed by the network which PRB's from the tuned LTE-M channel are allocated for the OFDM downlink at any moment in time. This could be any number of consecutive PRB's from one to six.

At intervals, the radio 15 calculates channel estimates for subcarrier frequencies within the LTE-M channel. It will do this while receiving the OFDM signal (optionally even when there is no control or data transmission allocated to the radio 15). It calculates the channel estimates using CRS RE's within the allocated PRB's, and sometimes also CRS RE's outside the allocated PRB's. It generates filtered channel estimates, centred on particular CRS RE's within the allocated PRB's, by centering a rectangular filter window (whose frequency width and time width may be fixed or may change over time) on the particular CRS RE in the LTE-M channel and applying filter weights to all of the unfiltered CRS RE's that lie within the filter window. Summing the products produces the desired filtered channel estimate. The radio 15 may use information derived from these filtered channel estimates, such as a signal-to-noise ratio for the channel, for conventional purposes. Among other things, it may communicate such information to the network 2.

The transmission of data back to the network 2 is performed in a conventional manner.

A shortcoming with a naïve approach to calculating filtered channel estimates, using a 1.08 MHz channel filter that is centred on the tuned LTE-M channel, is illustrated with reference to FIG. 4.

Figure 4:
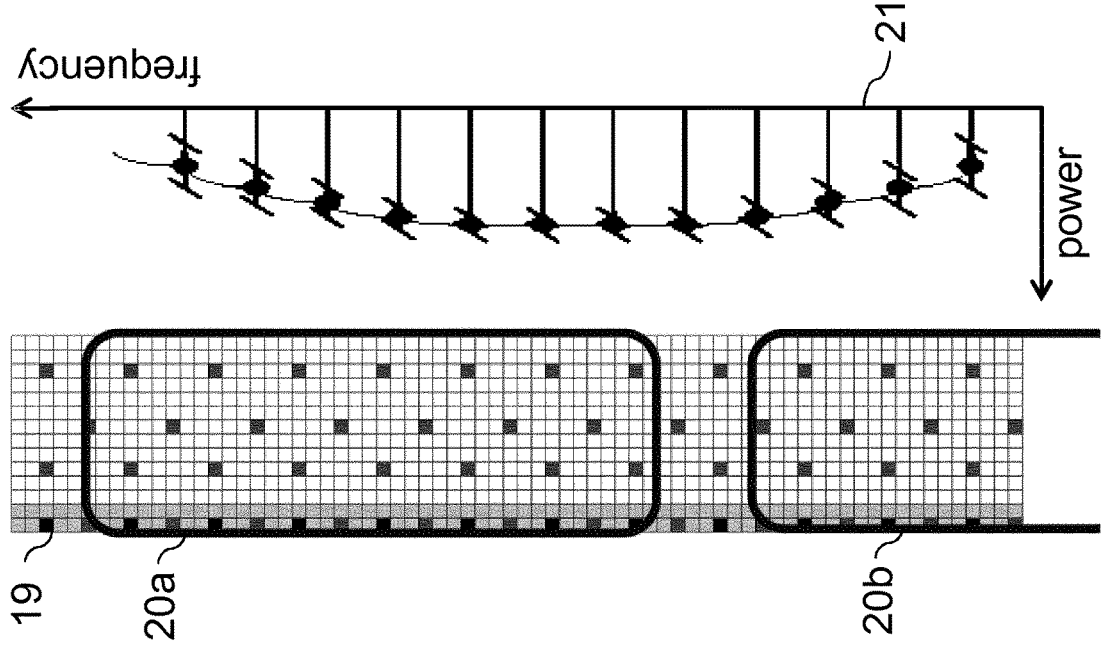
FIG. 4 is a diagram of a resource grid for an LTE-M channel with a sliding channel-estimate filter window, alongside a plot of signal power at different filter window positions.

FIG. 4 shows a resource grid 19 for a 1.08 MHz LTE-M channel. A filter window having a temporal extent of 1 millisecond and a frequency extent of approximately 600 kHz (forty×15 kHz subcarriers) is moved across the channel in order to calculate filtered channel estimates for different RE's within the channel. When the filter is centred on an RE such that the filter window 20a is fully contained within the LTE-M channel, the filter can have the full 600 kHz frequency extent. However, when the filter window 20b is centred on an RE that is less than 300 kHz from the edge of the channel, there is a portion of the filter window 20b that extends outside the 1.08 MHz channel filter, and so does not contain any CRS RE's, because these have been filtered by the channel filter. The effective size of the filter window 20a is therefore reduced. In this example, the second filter window 20b has a frequency extent of only approximately 285 kHz (19×15 kHz subcarriers), and the CRS RE's are no longer distributed symmetrically about the particular subcarrier at the centre of the filter window 20b.

Alongside the resource grid 19 is a plot 21 of signal power at different filter window positions over the resource grid 19. The plot 21 is vertically aligned with the resource grid 19 such that each point on the plot 21 corresponds to a respective frequency for the centre of the filter window. The error bars at each point indicate the signal-to-noise ratio (SNR) for the particular filtered channel estimate.

The plot 21 shows that, using a naive approach of filtering the LTE-M channel with a channel filter that is centred on the LTE-M channel, for subcarriers near the channel edge, the channel estimates are lower in amplitude (e.g., a half or less). Even more significantly, the channel estimates near the channel edge have poorer SNR (e.g., −3 dB or worse). This is because there are fewer unfiltered channel estimates available for inputting to the filter averaging.

Figure 5:
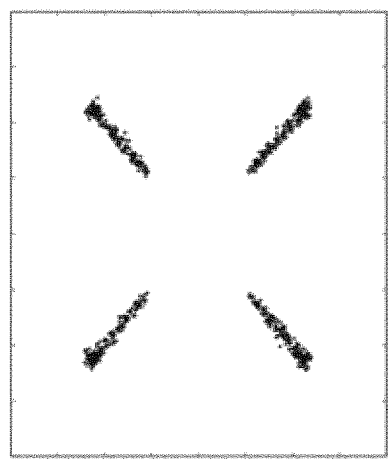
FIG. 5 is a simulated constellation diagram for filtered channel estimates calculated at CRS resource elements across an LTE-M channel using a channel filter equal to the channel width.

FIG. 5 shows how the constellation for the QPSK filtered channel estimates is distorted into four lines, due to the reduced power near the channel edges, rather than being clustered in four spots with constant amplitude.

Figure 6:
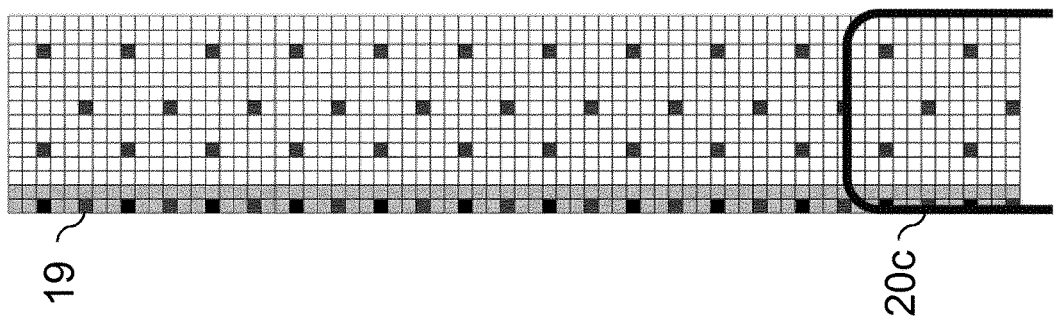
FIG. 6 is an LTE resource grid showing a channel-estimate filter window centred on a CRS resource element at the bottom edge of the LTE-M channel.

FIG. 6 shows a filter window 20c, nominally covering 16 CRS's, centred on a subcarrier right on the bottom edge of the LTE-M channel 19. Half of the filter window 20c is thus outside the LTE-M channel, which is the worst case situation.

The SNR after equalization, $SNR_{equ}$, can be approximated as:

$$SNR_{equ} = \frac{SNR_{inp} \cdot SNR_{che}}{SNR_{inp} + SNR_{che} + 1}$$

where $SNR_{inp}$ is the "input SNR", and $SNR_{che}$ is the "channel-estimate SNR".

Equalization here means that the received RE is multiplied with the complex conjugate of the channel estimate, after which this formula gives the resulting SNR.

In this example, the channel estimate is averaged over 16 CRS's, such that $SNR_{che} = SNR_{inp} + 12$ dB.

The innermost channel estimate of the filter window 20c has relative SNR=0.875. The outermost channel estimate of the filter window 20c will have relative SNR=0.5 (−3 dB), which is the maximum loss.

In addition to the signal strength and SNR problems, a channel filter that is centred on the LTE-M channel also leads to sample timing error issues, due to the asymmetrical distribution of the CRS RE's within the filter window near the channel edge.

Figure 7:
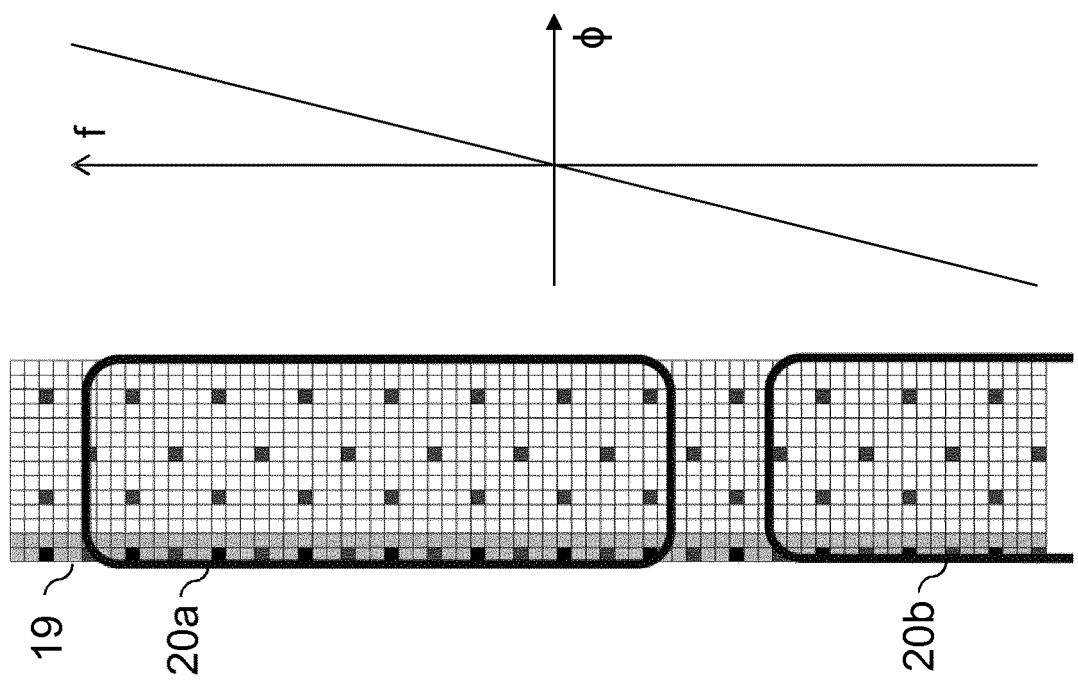
FIG. 7 is the resource grid of FIG. 4 alongside a plot of phase error against frequency across the LTE-M channel when using a channel filter equal to the channel width.

FIG. 7 shows the same resource grid 19 as FIG. 4, alongside a plot of phase error against frequency. Any sampling timing error creates a linear rotation of the subcarriers. For subcarriers near the channel centre, this is not problematic as the error affects CRS RE's symmetrically within the filter window, with positive errors cancelling out an equal number of negative errors. However, for subcarriers near the channel edge, the phase of the channel estimate will be calculated incorrectly due to non-symmetric averaging of CRS's, because of the absence of CRS RE's beyond the edge of the channel filter.

Figure 9:
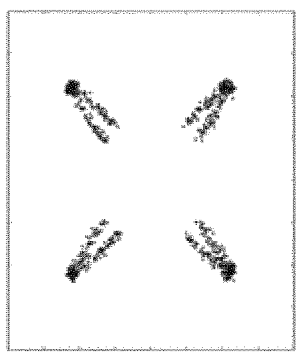
FIG. 9 is a simulated constellation diagram showing a timing error of 0.25 samples when using a channel filter equal to the channel width.
Figure 11:
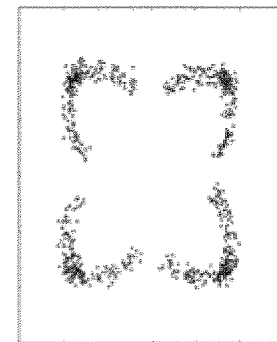
FIG. 11 is a simulated constellation diagram showing a timing error of one whole sample when using a channel filter equal to the channel width.
Figure 8:
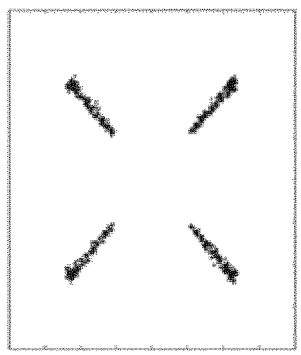
FIG. 8 is a simulated constellation diagram showing no timing error.
Figure 10:
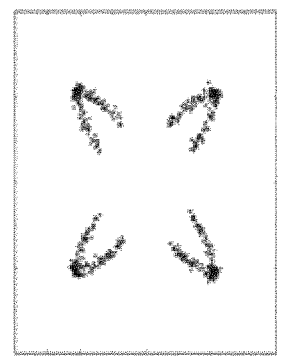
FIG. 10 is a simulated constellation diagram showing a timing error of 0.5 samples when using a channel filter equal to the channel width.

FIGS. 8, 9, 10 and 11 shows the effect of progressively large timing errors for channel estimates distributed across the LTE-M channel. FIG. 8 shows the case with no timing error. FIG. 9 shows a timing error of 0.25 samples. Channel estimates towards the channel edges have lower amplitude and are spread out in phase, positively and negatively for the two ends of the channel. FIG. 10 shows a timing error of 0.5 samples. FIG. 11 shows a timing error of one whole sample.

FIGS. 12-17 show how this problem can be mitigated in embodiments of the invention by offsetting the channel filter 15b. (Note that the black rectangles overlying the resource grids in FIGS. 12-17 represent blocks of allocated PRB's, not channel-estimate filter windows.)

For certain PRB allocations, the radio 15 will offset the frequency of the local oscillator 15a from the centre of the channel so that the channel filter 15b is offset relative to the LTE-M channel. Because the channel filter 15b is sized for the channel, this has the effect of filtering out subcarriers at one end of the LTE-M channel, while passing radio signals that lie beyond the other end of the tuned channel. So long as these out-of-channel signals still lie within a wider LTE system channel, they will also contain CRS RE's that can be used by the radio 15 as input for calculating filtered channel estimates for subcarriers within the channel—and specifically for subcarriers within the allocated PRB's. In this way, the quality of the channel estimates can be improved, and the amplitude, SNR and phase issues identified above can be reduced or removed altogether.

How much improvement is possible will depend on how many PRB's are allocated to the OFDM signal and where they are located within the LTE-M channel. It can also depend on where the LTE-M channel is positioned within an LTE system channel.

Typically, the radio 15 will attempt to set the local oscillator 15a so that it is positioned between the two most central PRB's in the block of allocated PRB's. When there is an even number of allocated PRB's (i.e., two, four or six), this can be done exactly. When there is an odd number of allocated PRB's (i.e., one, three or five), the local oscillator 15a may still be offset from the centre of allocated PRB's, but typically only by half a PRB.

When the allocated PRB's are already distributed symmetrically about the centre of the LTE-M channel, the channel filter 15b can be centred on the channel. However, when the allocated PRB's are not centred, the radio 15 will typically offset the channel filter 15b (unless no improvement is possible—e.g., when the LTE-M channel is located at one edge of a 10 MHz LTE system channel).

Figure 12:
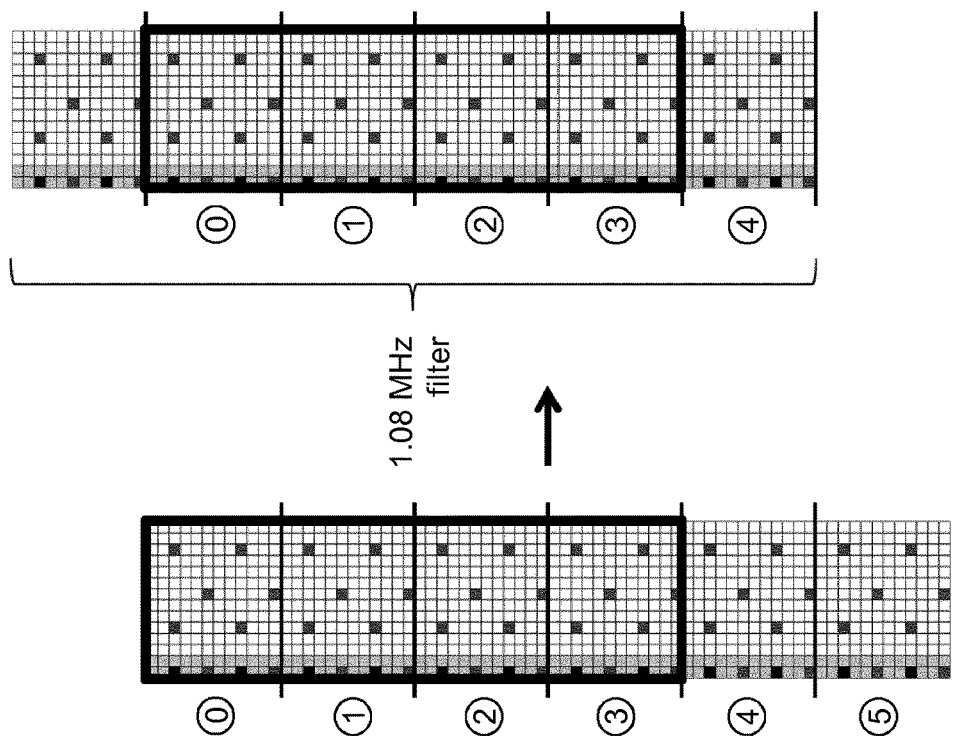
FIG. 12 is a diagram of a resource grid for an LTE-M channel showing an offset filter position used in some embodiments when four PRBs have been allocated.

FIG. 12 shows a situation in which four PRB's have been allocated: PRB's 0, 1, 2 and 3.

Rather than setting the local oscillator 15a between PRB 2 and PRB 3, as a naïve approach might do, the radio 15 sets the local oscillator 15a to be between PRB 1 and PRB 2. The channel filter 15b is then offset relative to the tuned LTE-M channel, such that it passes PRB's 0-4 but filters out PRB 5. It also passes a PRB located outside the LTE-M channel, beyond PRB 0. This could be a PRB of an adjacent LTE-M channel, or it could be a PRB that is part of an LTE signal of a different category (e.g., Cat-0). It will typically contain a signal intended for other user equipment, distinct from the radio 15. However, the radio 15 can nevertheless make use of the CRS signals contained in this additional PRB when centering a filter window on a CRS RE in one of the allocated PRB block, such as PRB 0 or PRB 1. The channel filter 15b is centred on the allocated PRB's.

Figure 13:
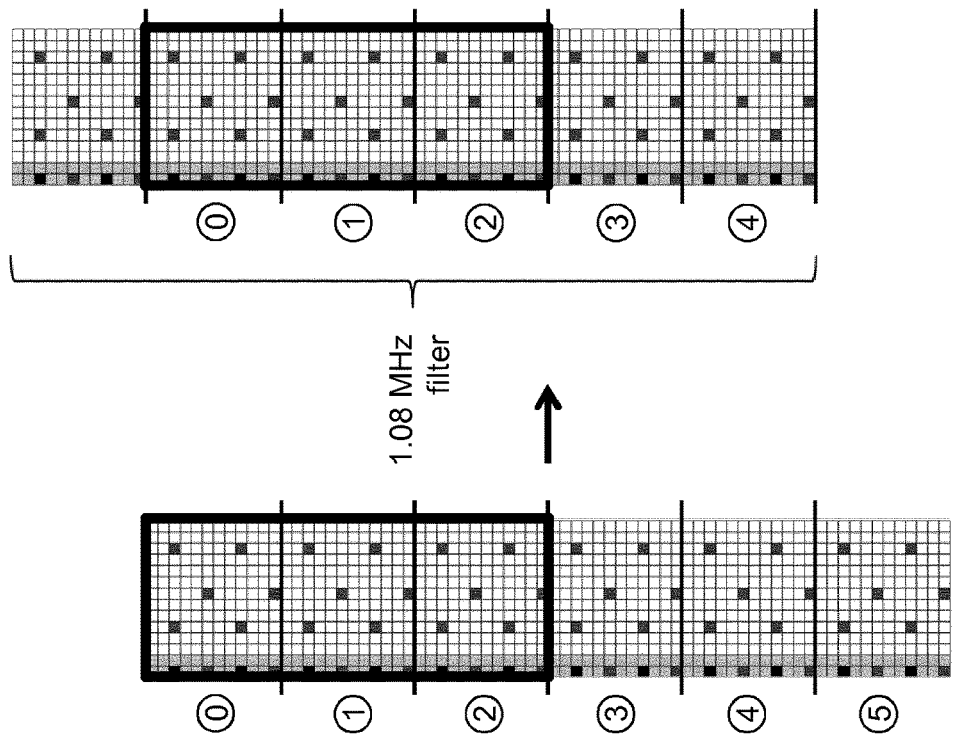
FIG. 13 is a diagram of a resource grid for an LTE-M channel showing an offset filter position used in some embodiments when three PRBs have been allocated.

FIG. 13 shows a situation in which three PRBs—PRBs 0, 1 & 2—have been allocated. Some embodiments may only support offsetting the channel filter in integer multiples of one PRB, or for other reasons it may be desirable only to offset in units of one PRB. In such situations it will not be possible, or will not be desirable, to centre the channel filter 15b precisely on the allocated PRB's. Instead, the local oscillator 15a is set to be between PRB 1 and PRB 2, so that all three allocated PRB's are moved away from the edges of the channel filter 15b, thereby leading to more accurate channel estimates for the subcarriers in the allocated PRB's.

Figure 14:
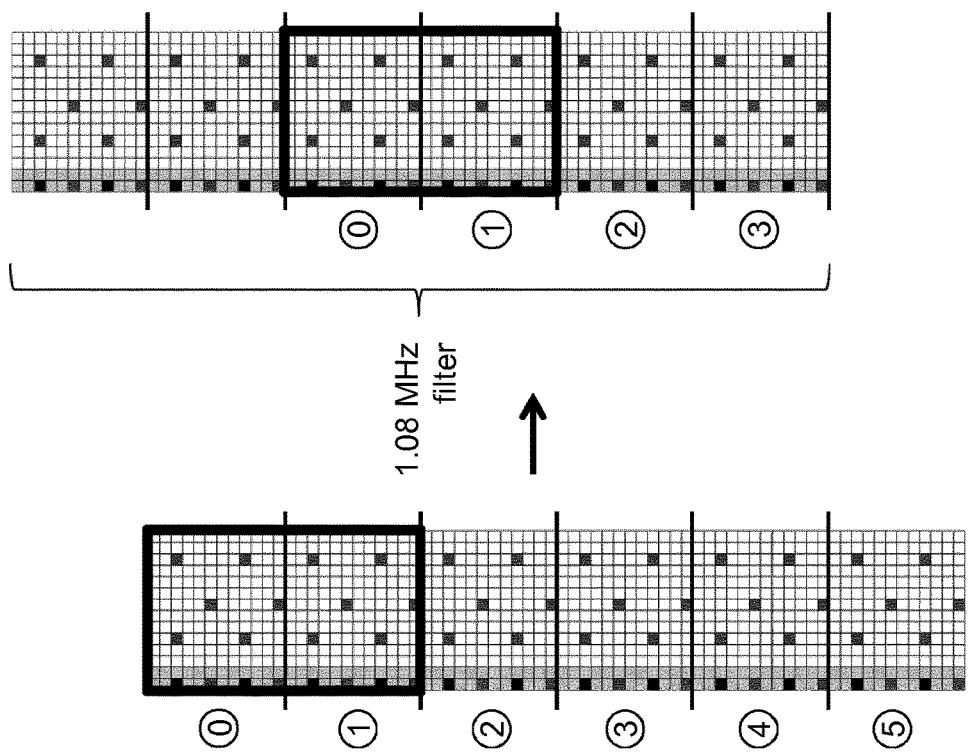
FIG. 14 is a diagram of a resource grid for an LTE-M channel showing an offset filter position used in some embodiments when two PRBs have been allocated.

FIG. 14 shows a situation in which two PRBs have been allocated—in this case, PRBs 0 & 1. The local oscillator 15a is set to be between the two allocated PRB's, which results in the PRB's being centred about the middle of the channel filter 15b. In the example of FIG. 14 the two allocated PRB's are at the edge of the LTE-M channel; the same approach can, of course, be taken when PRB's 4 & 5 are allocated. However, there will also be an improvement (albeit not necessarily so great) by offsetting the channel filter 15b when the two allocated PRB's are not at the edge—i.e., when PRBs 1 & 2 are allocated, or when PRB's 3 & 4 are allocated—so long as they are not already centred. When PRB's 2 & 3 are allocated, it would be disadvantageous to offset the channel filter 15b relative to the channel.

Figure 15:
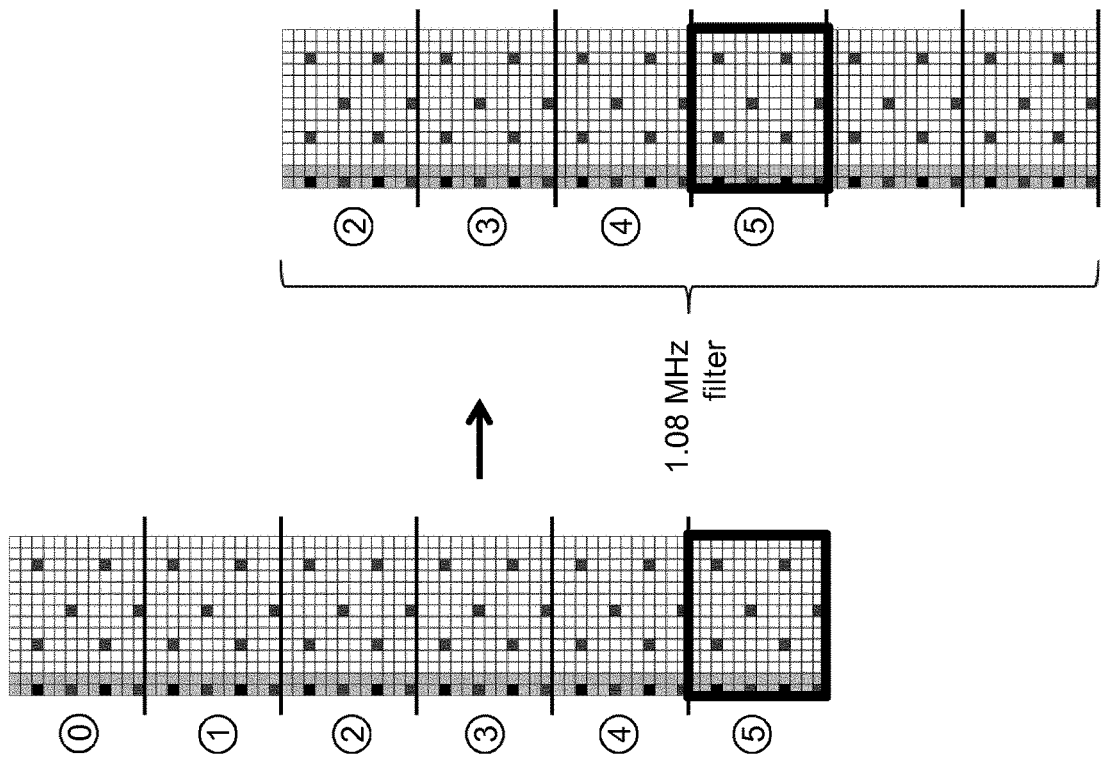
FIG. 15 is a diagram of a resource grid for an LTE-M channel showing an offset filter position used in some embodiments when one PRB has been allocated.

FIG. 15 shows a situation in which one PRB has been allocated—in this case, PRB 5. If a single PRB is allocated, which is not PRB 2 or 3, then it can be advantageous to set the local oscillator 15a to the start or end of the allocated PRB, so that the PRB is brought closer to the centre of the channel filter 15b. In the example of FIG. 15, the local oscillator 15a is set between PRB's 4 and 5.

When five PRB's are allocated, there will always be one PRB at the edge of the channel filter 15b. Naively, it would appear that no improvement is possible. However, FIG. 16 shows a method that can be performed in some embodiments for improving the quality of the filtered channel estimates even in this situation. The radio 16 alternately sets the local oscillator 15a either side of the central PRB of the five allocated PRBs, switching at intervals. This has the effect of changing which of the PRB's at the ends of the allocated five PRB's is at the edge of the channel filter over time. Because the channel estimates will generally be of poorer quality for the PRB that is at the channel edge, the estimates for a particular PRB can be given a lower weighting whenever that PRB is at the edge of the channel filter 15b, and a higher weighting whenever the PRB is not at the edge. The weightings can be applied to phase and/or amplitude. For example, the phase of the CRS in an edge PRB of the allocation can be weighted more (or set entirely) according to the phase when that edge PRB is not located at the edge of the channel filter 15b. A weighted average could be taken over time, or the weightings could be used in any other appropriate way when further processing the channel estimates, thereby improving the accuracy over time. Although both of the edge PRBs of the allocation will be affected by the channel edge distortion at times, they will not be maximally affected, which is an improvement from a Block Error Probability point of view.

In the example of FIG. 16, PRB's 0-5 have been allocated. In time periods t=2n, for integer values of n, the local oscillator 15a is set between PRB's 2 & 3, while in time periods t=2n+1, the local oscillator 15a is set between PRB's 1 & 2.

Figure 17:
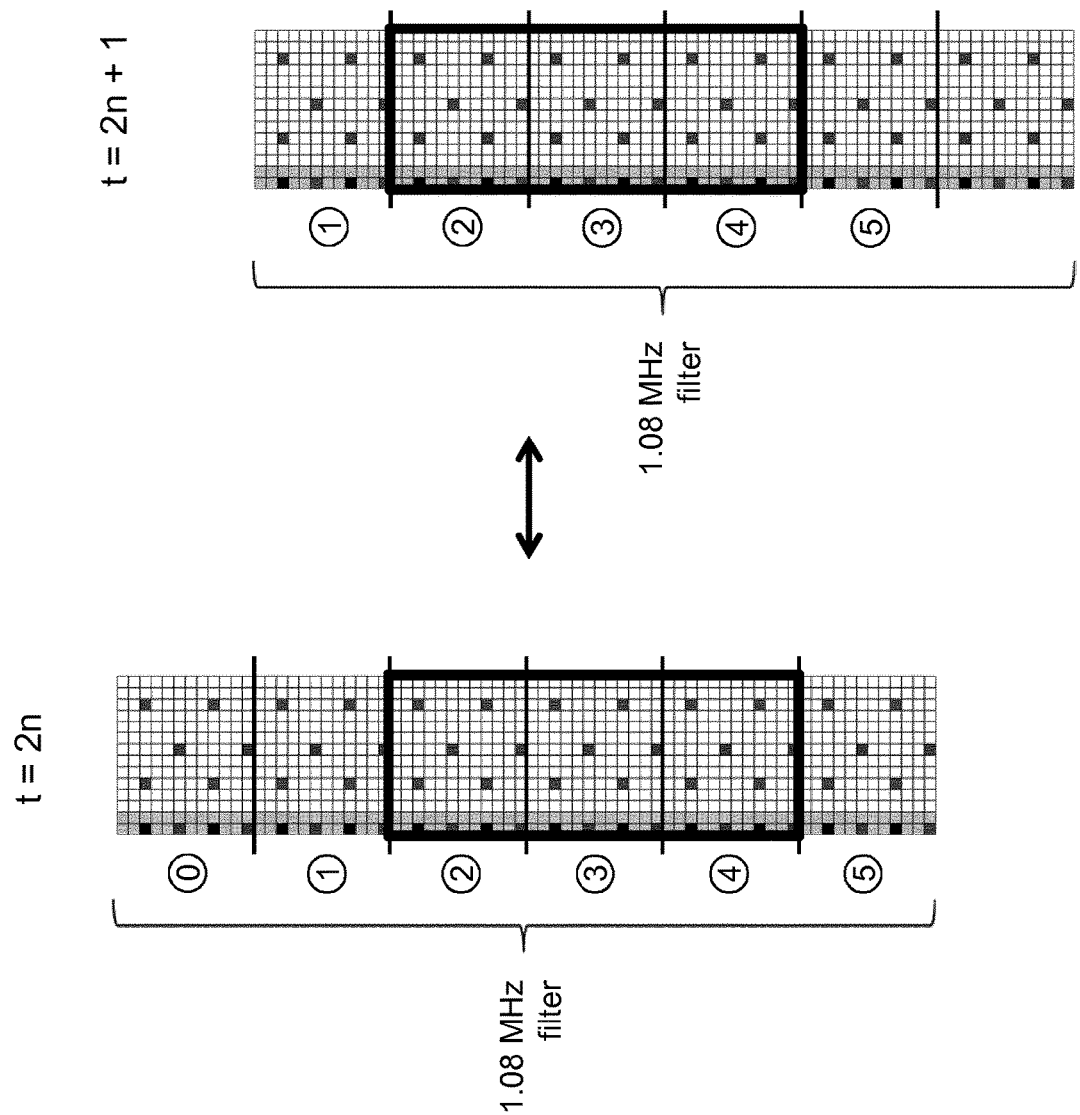
FIG. 17 is a diagram of a resource grid for an LTE-M channel showing two alternating filter positions used in some embodiments when three PRBs have been allocated.

FIG. 17 shows how this same toggling approach can be used, to give improved channel estimates over time, when three PRB's are allocated. In this example, PRB's 2, 3 & 4 are allocated. When t=2n, the local oscillator 15a is set between PRB's 2 & 3, while in time periods t=2n+1, the local oscillator 15a is set between PRB's 3 & 4. This can give improved results, especially when the filter window for the channel estimate extends beyond two PRB's in frequency.

In some situations, the offsetting of the local oscillator 15a and channel filter 15b may be possible only during certain time periods. In particular, LTE-M specifies that the radio 15 should monitor a control channel, known as the MPDCCH (Machine-type communications Physical Downlink Control CHannel), when it is present. The MPDCCH is transmitted over the unallocated PRB's of the tuned LTE-M channel. Higher-level signalling is used to set the MPDCCH interval, which determines how often the MPDCCH may be present; the interval can be between every subframe (i.e., continuous) and every ten subframes. When the MPDCCH is present, the radio 15 does not offset the channel filter 15b relative to the channel, since the whole LTE-M channel must pass through the channel filter 15b in order that the MPDCCH can be decoded in addition to the OFDM data signal that is encoded on the allocated PRBs. Therefore, the radio 15 only offsets the local oscillator 15a, as described herein, on those subframes where the radio 15 knows (from the higher-level signalling) that the MPDCCH will not be present. An MPDCCH interval of one would not allow for any offsetting; however, this is not expected to be used normally, because it would place a large power demand on the device 1, and would rapidly drain the battery 11.

In the special case that five PRB's are allocated, no monitoring of the MPDCCH is required, because the MPDCCH occupies a minimum of two PRBs, so cannot fit into the same subframe as the data signal. Thus the alternating offset approach described with reference to FIG. 16 may be applied across all such subframes.

If the Rx data is repeated according to the Coverage Extension feature of eMTC, the same usage restrictions would apply.

Figure 18:
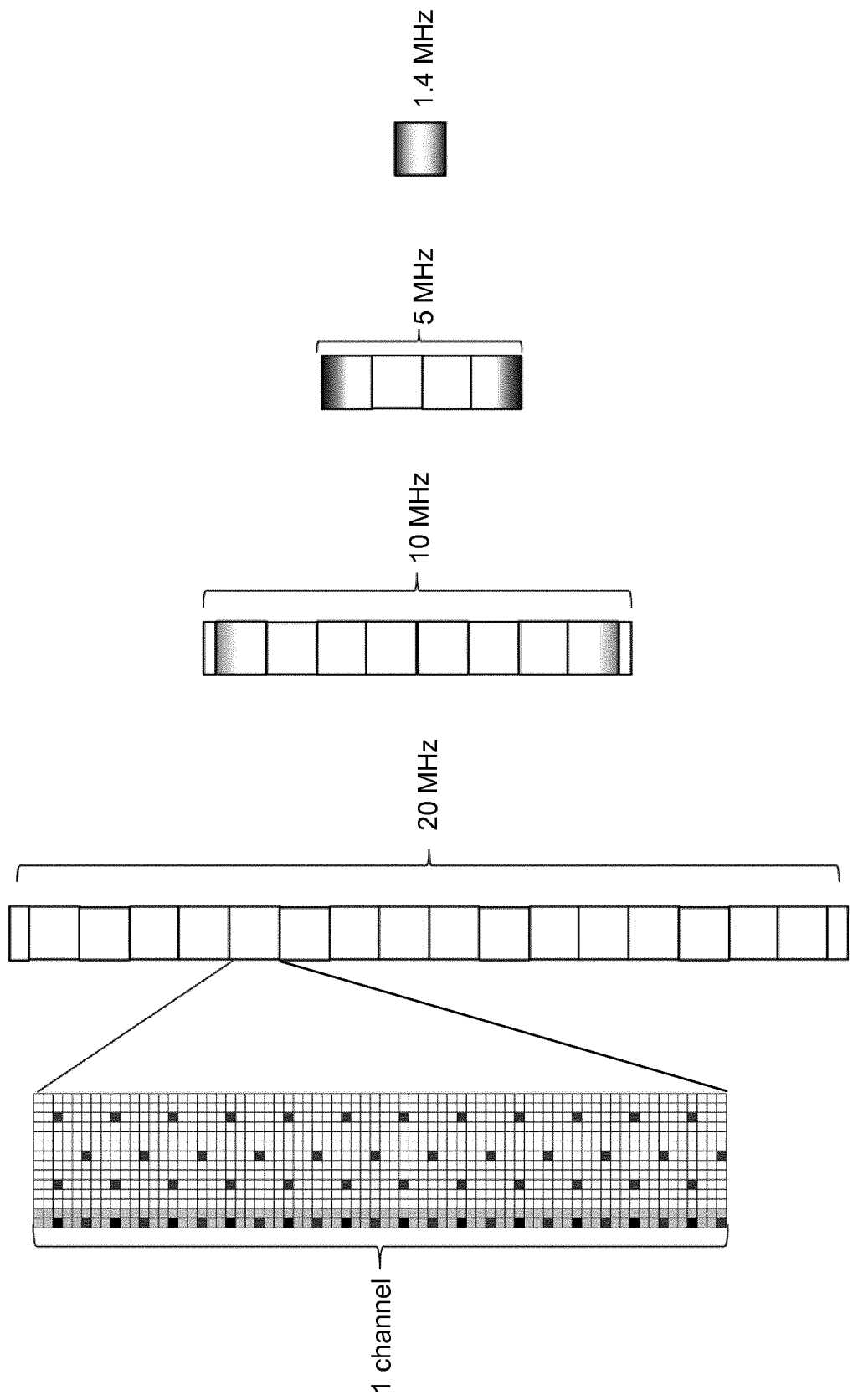
FIG. 18 is a diagram of a resource grid for an LTE-M channel in the context of 20 MHz, 10 MHz, 5 MHz and 1.4 MHz system channels.

FIG. 18 shows how one narrowband LTE-M channel, consisting of six PRBs, can fit within 20 MHz, 10 MHz, 5 MHz and 1.4 MHz LTE system channels.

A 20 MHz LTE system channel fits sixteen LTE-M channels plus two unused PRB's at each edge. A 10 MHz LTE system channel fits eight LTE-M channels plus one unused PRB at each edge. A 5 MHz LTE system channel can exactly fit four LTE-M channels. A 1.4 MHz LTE system channel is fully occupied by one LTE-M channel, with an allowance for filter roll-off (since the actual bandwidth used for LTE-M signals is only 1.08 MHz).

In a 20 MHz LTE channel, the channel-edge issues can be completely mitigated for subframes where offsetting is possible, even when the tuned LTE-M channel is at the edge of the 20 MHz system channel, because the two unused PRB blocks still contain CRS RE's which allow the filter window to be fully filled with CRS RE's. (This assumes the filter window is at most four PRB's wide in frequency; if it is larger than this, it may not always be possible to completely mitigate the edge effects even in a 20 MHz LTE channel.)

In a 10 MHz LTE channel, offsetting the channel filter 15b can completely mitigate the channel-edge issues for all LTE-M channels except the two edge channels. For these, the issues are still partly mitigated, as represented by the light grey shading for these LTE-M blocks in FIG. 18.

Although not illustrated here, the situation for a 15 MHz system channel is similar to that of a 10 MHz channel in that there is one unused PRB at each edge of the system channel. There is also a third unused PRB located in the middle of the system channel. The two edge PRBs allow for partial mitigation of the channel-edge distortions, as with the 10 MHz channel. The CRS RE's in the central unused PRB may be used for mitigating errors in the LTE-M channels adjacent the central unused PRB.

In a 5 MHz LTE channel, offsetting the channel filter 15b can completely mitigate the channel-edge issues for the two central LTE-M channels, but not the outer two LTE-M channels (as represented by the dark grey shading for these two blocks). This still represents a significant improvement overall.

In a 1.4 MHz, there is no benefit in offsetting the channel filter 15b because there will not be any usable CRS's beyond the edges of the LTE-M channel.

It will be appreciated by those skilled in the art that the invention has been illustrated by describing one or more specific embodiments thereof, and specific examples of PRB allocations, but is not limited to these embodiments and example allocations. Many variations and modifications are possible, within the scope of the accompanying claims.

The invention claimed is:

1. A radio receiver for receiving an OFDM data signal from a radio transmission system that transmits OFDM data signals over respective channels of a plurality of predetermined radio channels, each channel having a respective channel bandwidth and comprising a respective plurality of OFDM subcarriers, and that transmits predetermined reference signals at predetermined times on a reference-signal set of the respective plurality of OFDM subcarriers,
   wherein the radio receiver comprises a local oscillator and a channel filter,
   wherein the radio receiver is configured to tune a channel of the plurality of predetermined radio channels by:
      controlling the local oscillator to generate a periodic signal;
      receiving radio signals from the radio transmission system and mixing the radio signals with the periodic signal to generate a mixed signal; and
      passing the mixed signal through the channel filter, wherein the channel filter has a passband that corresponds to the channel bandwidth of the tuned channel,
   wherein the radio receiver is configured to receive, from the radio transmission system, allocation information identifying a set of allocated subcarriers, of the plurality of OFDM subcarriers in the tuned channel, on which to receive an OFDM data signal,
   wherein the radio receiver is configured to use the allocation information to receive the OFDM data signal, from the radio transmission system, modulated on the set of allocated subcarriers, wherein, when the set of allocated subcarriers spans an allocated frequency range that is less than the channel bandwidth of the tuned channel and that is offset from a center of the tuned channel in an offset direction, the radio receiver is configured to offset the channel filter from the center of the tuned channel in said offset direction by a filter offset amount, such that the channel filter passes i) said OFDM data signal; ii) an in-allocation reference signal of the predetermined reference signals, received on a subcarrier of the set of allocated subcarriers; and iii) an out-of-channel reference signal of the predetermined reference signals, received on an out-of-channel subcarrier of the plurality of OFDM subcarriers that is located outside the tuned channel, and wherein the radio receiver comprises channel estimation logic configured to use both i) the in-allocation reference signal, and ii) the out-of-channel reference signal, to calculate a channel estimate for a subcarrier of the set of allocated subcarriers within the tuned channel.

2. The radio receiver of claim 1, wherein the radio receiver is configured to tune an LTE Cat-M1 channel, and wherein the channel estimation logic is configured to calculate the channel estimate using i) in-allocation LTE cell-specific reference signal (CRS), and ii) an out-of-channel LTE CRS.

3. The radio receiver of claim 1, wherein the respective plurality of OFDM subcarriers are regularly spaced at intervals, and wherein the filter offset amount equals an integer multiple of an OFDM subcarrier interval.

4. The radio receiver of claim 1, wherein the radio receiver is configured, at times, to offset the channel filter so that the channel filter is centered on the allocated frequency range.

5. The radio receiver of claim 1, wherein the plurality of OFDM subcarriers in the tuned channel are grouped in blocks in the allocation information, the blocks having a uniform frequency width, and wherein, at times, the filter offset amount is an integer number of block widths, said integer being a greatest integer that is less than or equal to the number of block widths by which a center of the allocated frequency range is offset from the center of the tuned channel.

6. The radio receiver of claim 1, configured to determine the filter offset amount based on the allocation information and on one or more further criteria, including: a position of the tuned channel within the plurality of predetermined radio channels; and whether the radio receiver needs to receive data on one or more unallocated subcarriers in the tuned channel.

7. The radio receiver of claim 1, configured to pass the mixed signal through the channel filter such that the channel filter passes a plurality of out-of-channel reference signals of the predetermined reference signals, received on a plurality of out-of-channel OFDM subcarriers located outside the tuned channel, wherein all the out-of-channel OFDM subcarriers that are passed by the channel filter are located beyond one edge of the tuned channel in the offset direction.

8. The radio receiver of claim 1, wherein the channel estimation logic is configured, when calculating a channel estimate for an OFDM subcarrier of the set of allocated subcarriers, to apply a set of filter weights to a plurality of unfiltered reference signals contained in a filter window.

9. The radio receiver of claim 8, configured to use the channel estimation logic to calculate respective channel estimates for each of a plurality of OFDM subcarriers of the set of allocated subcarriers, and to use filter windows having a common frequency extent when calculating each of the channel estimates.

10. The radio receiver of claim 1, wherein the filter offset amount is such that the channel filter passes only spectrum occupied by OFDM subcarriers transmitted by the radio transmission system, and passes no spectrum outside these OFDM subcarriers.

11. The radio receiver of claim 1, configured, for at least some allocations of subcarriers, to change the filter offset amount over time, while receiving the OFDM data signal, even as the set of allocated subcarriers remains unchanged.

12. A radio communication method for receiving an OFDM data signal from a radio transmission system that transmits OFDM data signals over respective channels of a plurality of predetermined radio channels, each channel having a respective channel bandwidth and comprising a respective plurality of respective plurality of OFDM subcarriers, and that transmits predetermined reference signals at predetermined times on a reference-signal set of the OFDM subcarriers, the method comprising:
   a radio receiver tuning a channel of the plurality of predetermined radio channels by:
      generating a periodic signal;
      receiving radio signals from the radio transmission system and mixing the radio signals with the periodic signal to generate a mixed signal; and
      passing the mixed signal through a channel filter; and
   the radio receiver receiving, from the radio transmission system, allocation information identifying a set of allocated subcarriers, of the plurality of OFDM subcarriers in the tuned channel, on which to receive an OFDM data signal;
   the radio receiver using the allocation information to receive the OFDM data signal, from the radio transmission system, modulated on the set of allocated subcarriers,
the method further comprising:
   the set of allocated subcarriers spanning an allocated frequency range that is less than the channel bandwidth of the tuned channel and that is offset from a center of the tuned channel in an offset direction;
   the radio receiver offsetting the channel filter from the center of the tuned channel in said offset direction by a filter offset amount;
   the channel filter having a passband that is wider than the allocated frequency range, such that the channel filter passes i) said OFDM data signal; ii) an in-allocation reference signal of the predetermined reference signals, received on a subcarrier of the set of allocated subcarriers; and iii) an out-of-channel reference signal of the predetermined reference signals, received on an out-of-channel subcarrier of the plurality of OFDM subcarriers that is located outside the tuned channel; and
   the radio receiver using both i) the in-allocation reference signal, and ii) the out-of-channel reference signal, to calculate a channel estimate for a subcarrier of the set of allocated subcarriers within the tuned channel.

13. A non-transitory computer-readable medium having software stored thereon comprising instructions which, when executed by a processor of a radio receiver, cause the radio receiver to receive an OFDM data signal from a radio transmission system that transmits OFDM data signals over respective channels of a plurality of predetermined radio channels, each channel having a respective channel bandwidth and comprising a respective plurality of OFDM subcarriers, and that transmits predetermined reference signals at predetermined times on a reference-signal set of the respective plurality of OFDM subcarriers, wherein:
   the radio receiver comprises said processor, a local oscillator and a channel filter;
   the radio receiver is configured to tune a channel of the plurality of predetermined radio channels by:
      controlling the local oscillator to generate a periodic signal;
      receiving radio signals from the radio transmission system and mixing the radio signals with the periodic signal to generate a mixed signal; and
      passing the mixed signal through the channel filter, wherein the channel filter has a passband that corresponds to the channel bandwidth of the tuned channel; and
   the radio receiver is configured to receive, from the radio transmission system, allocation information identifying a set of allocated subcarriers, of the plurality of OFDM subcarriers in the tuned channel, on which to receive an OFDM data signal;

the radio receiver is configured to use the allocation information to receive the OFDM data signal, from the radio transmission system, modulated on the set of allocated subcarriers;

and wherein the software comprises instructions for controlling the radio receiver so that:

when the set of allocated subcarriers spans an allocated frequency range that is less than the channel bandwidth of the tuned channel and that is offset from a center of the tuned channel in an offset direction, the radio receiver offsets the channel filter from the centre of the tuned channel in said offset direction by a filter offset amount, such that the channel filter passes i) said OFDM data signal; ii) an in-allocation reference signal of the predetermined reference signals, received on a subcarrier of the set of allocated subcarriers; and iii) an out-of-channel reference signal of the predetermined reference signals, received on an out-of-channel subcarrier of the plurality of OFDM subcarriers that is located outside the tuned channel; and the processor uses both i) the in-allocation reference signal, and ii) the out-of-channel reference signal, to calculate a channel estimate for a subcarrier of the set of allocated subcarriers within the tuned channel.

\* \* \* \* \*